United States Patent
Richards

[19]

[11] Patent Number: 5,922,094
[45] Date of Patent: Jul. 13, 1999

[54] WATER REMOVAL SYSTEM

[76] Inventor: Darrell Richards, P.O. Box 789, Morro Bay, Calif. 93443

[21] Appl. No.: 08/763,830

[22] Filed: Dec. 11, 1996

[51] Int. Cl.[6] .................................................. F16T 5/54
[52] U.S. Cl. ............................. 55/355; 55/466; 96/408; 137/177; 210/532.1
[58] Field of Search ........................ 55/355, 424, 431, 55/466, DIG. 15, DIG. 17, DIG. 23; 96/408; 137/171, 177, 216.1, 216.2, 247.11; 210/532.1

[56] References Cited

U.S. PATENT DOCUMENTS

| | | | |
|---|---|---|---|
| 132,939 | 11/1872 | Vansteenburgh | 137/177 |
| 681,369 | 8/1901 | Nourse . | |
| 699,563 | 5/1902 | Plantinga | 55/355 |
| 761,316 | 5/1904 | Miller | 137/247.11 |
| 772,037 | 10/1904 | Harris | 137/177 |
| 1,156,907 | 10/1915 | King | 137/216.1 |
| 1,573,131 | 2/1926 | Bernard | 137/177 |
| 1,758,318 | 5/1930 | Hayley | 137/247.11 |
| 2,517,718 | 8/1950 | Sall . | |
| 2,593,655 | 4/1952 | Byer . | |
| 2,745,510 | 5/1956 | Hultgren | 210/532.1 |
| 3,460,319 | 8/1969 | Tkach . | |
| 3,933,449 | 1/1976 | Miselem | 55/DIG. 23 |
| 4,182,617 | 1/1980 | Al-Saidi | 55/466 |
| 4,193,967 | 3/1980 | Black | 55/355 |
| 4,279,269 | 7/1981 | Schink et al. . | |
| 4,372,290 | 2/1983 | Visos et al. . | |
| 4,702,755 | 10/1987 | Bishop . | |
| 4,924,860 | 5/1990 | Larson et al. . | |
| 4,985,055 | 1/1991 | Therse et al. . | |
| 5,091,088 | 2/1992 | Essop . | |
| 5,141,048 | 8/1992 | Sausner . | |
| 5,205,843 | 4/1993 | Kaschemekat et al. . | |
| 5,209,761 | 5/1993 | Ivester et al. . | |
| 5,228,436 | 7/1993 | Parkin . | |
| 5,325,821 | 7/1994 | Gloersen . | |
| 5,374,300 | 12/1994 | Kaschemekat et al. . | |
| 5,419,359 | 5/1995 | Kor . | |

FOREIGN PATENT DOCUMENTS

| | | | |
|---|---|---|---|
| 3708439 | 9/1988 | Germany | 137/171 |
| 956905 | 9/1982 | Russian Federation | 137/171 |

OTHER PUBLICATIONS

Kenneth D. Kerri, Bill Dendy, John Brady, William Crooks, "Operation of Wastewater Treatment Plants, Second Edition", *Science Digest*, 1980, pp. 117–120.

Varec, Inc., Catalog No. S–4, "Digester Gas Control Positive Fire Prevention Minimum Insurance Rates Easy Maintenance Foolprooof".

Varec, Catalog, Typical Flow and Installation Diagram Multiple Digester Gas System.

Varec, Catalog, Sediment Trap.

Varec, Catalog, Drip Traps.

Varec, Catalog, "Pressure Relief and Vacuum Breaker Valve".

*Primary Examiner*—C. Scott Bushey
*Attorney, Agent, or Firm*—Knobbe, Martens, Olson & Bear, LLP

[57] ABSTRACT

An apparatus for automatically removing water from a digester system includes a sediment trap attached to a drain system wherein gas, water and sediment enter the sediment trap by way of gas lines, water and sediment are separated from the gas and settle within the sediment trap while the gas is expelled from the sediment trap, and wherein the gas pressure and weight of the water column within the sediment trap are balanced against a water column within a water outlet line to form a water seal to prevent gas from escaping into the atmosphere while simultaneously expelling excess water accumulating in the sediment trap.

9 Claims, 3 Drawing Sheets

WATER REMOVAL SYSTEM

BACKGROUND OF THE INVENTION

1. Field of the Invention

The present invention relates to an automatic water drain system, for use with a gas system, which allows for the automatic removal of water from gas lines and sediment traps, without relying on manual drainage or sensitive floatation devices for non-manual removal, and is suitable for use generally with a gas digester system and, in particular, a sediment trap.

2. Description of the Related Art

The typical method or apparatus for removing condensed water from gas lines in a gas digester system is to run gas lines through sediment traps, which are well known in the art. These sediment traps usually consist of a cylindrical tank or enclosed chamber and are of sufficient volume to store a substantial volume of water and sediment. Digester gas is rather wet and this moisture condenses as the digester gas travels from the heated tank to a cooler temperature. As gas runs through the gas lines and into the sediment trap, condensed water and sediment separates from the gas and collects at the bottom of the sediment trap. At some time, however, these sediment traps will become full and require draining. Since a larger volume of water is produced than sediment, the water requires draining more frequently. Thus, simply attaching a drain at the bottom of the sediment trap may not be practical in that sediment will be drained along with water every time the trap is drained.

To address the problem of how to drain water but not sediment, "drip traps" have been developed and used. The typical drip trap is an enclosed chamber configured to fit externally at the bottom of the sediment trap and receive water, but not sediment, as water collects in the sediment trap (these drip traps usually hold a liter or two of water). The drip trap, then, is drained thereby draining only water from the sediment trap. One such device is an enclosed chamber without an output port that can be manually opened and closed with a manually operated valve to release the accumulated water. These drip traps generally must be drained at least once a day, and possibly more frequently in cooler weather. One problem that exists with drip traps of the manual operation type, is that they require manual effort to be drained and operate effectively. Thus, they rely on the human factor. Such traps, therefore, are prone to neglect insofar as individuals may forget or neglect to drain the devices. If the drip traps are not drained, the excess water will accumulate in the sediment trap and eventually spill over into the gas pipes which could cause damage to compressors, boilers and blowers as well as interfere with gas utilization. Another such device is also referred to as an automatic drip trap and is equipped with a float and needle valve orifice. The device operates by "automatically" draining when the water column in the drip trap rises, thereby raising the float, which in turn, opens the valve to the trap and releases water. The problem with such devices is that corrosion, sediment, or scale in the gas system can and does prevent the needle from seating or shutting completely after drainage. This, in turn, causes the drip trap to leak water. When the leak has caused all of the water in the sediment trap to drain, gas will then leak into the atmosphere. This has very dangerous and deleterious effects on the health of people in the vicinity as well as the environment. In addition, both types of devices are expensive, requiring precisely machined drip traps for effective use and extensive maintenance for manual drainage, repairing leaking valves or repairing equipment down the gas stream damaged by water that spilled over into the gas lines.

Hence there is a need for a device that provides automatic drainage yet is reliable, inexpensive and requires little maintenance.

SUMMARY OF THE INVENTION

These aforementioned needs are satisfied by the present invention, which is comprised of a sediment trap attached to a drain system wherein gas, water and sediment enter the sediment trap by way of gas lines, water and sediment are separated from the gas and settle within the sediment trap while the gas is expelled out of the sediment trap; and wherein the gas pressure and weight of the water column apply sufficient pressure to force excess water through the drain system and discharge the water out of the system. Specifically, the invention drains water from a sediment trap automatically using water in the drain system as a seal to prevent digester gas* from escaping into the atmosphere. At the same time, the automatic water drain system releases water from the system by the gas pressure imposed on the water column. The invention has the advantages of draining accumulated water automatically by employing the use of the weight of the water column versus the gas pressure to automatically force water out of the system without relying on manual drainage. Moreover, it does not require substantial maintenance, and is inexpensive to produce.

The general object of this invention is to provide a method and apparatus for automatically removing condensed water from gas lines and traps without having to manually drain the water or regularly maintain sensitive floatation devices. The invention uses gas pressure in the gas lines to push water out of the drain system while, at the same time, using the counter pressure of the water column to act as a seal thereby preventing gas from entering the atmosphere through the drain system.

In one aspect of the invention, a sediment trap is coupled with a drain system to create an automatic drain apparatus for use in a gas digester system whereby condensed water is separated from digester gas and accumulates in the sediment trap, and this accumulated water is automatically drained from the system without the need for the system to be manually drained.

The apparatus is used with and coupled to a sediment trap and is comprised of a series of pipes in communication with each other. The first pipe is coupled to the sediment trap and is configured to receive water from the sediment trap. This water drain apparatus is further comprised of a vertical pipe in communication with the first receiving pipe which extends vertically for a length equal to or slightly higher than the height of the water column in the sediment trap. Coupled to the top of the second vertical pipe is an anti-syphon vent and fill cap to allow the insertion of water into the drain system upon initial use and to prevent negative pressure from creating a syphon effect thereby drawing water back into the drain system from the drain. Coupled with the second vertical pipe is a third pipe angled directly away or downward from the vertical pipe. This pipe receives water and directs it to an additional draining pipe or a draining spout. Water is drained from the system by the pressure applied to the water column in the sediment trap by the gas pressure in the sediment trap. Thus, water is drained by the competing pressures of the continual gas and the water column, and therefore operates automatically without the aid of moving parts, sensitive floatation devices or manual labor.

In yet another aspect of the invention, a method is disclosed for draining water from a sediment tank without having to manually drain sediment traps, utilizing downward gas pressure in the sediment tank to apply pressure against the water column thereby forcing excess water out of the pipe assembly while at the same time, using the pressure of the water column to maintain a seal thereby preventing gas from escaping into the atmosphere.

BRIEF DESCRIPTION OF THE DRAWINGS

These and other features of the invention will now be described with reference to the drawings of a preferred embodiment which is intended to illustrate and to limit the invention, and in which.

DETAILED DESCRIPTION OF THE PREFERRED EMBODIMENT

Figure 1:
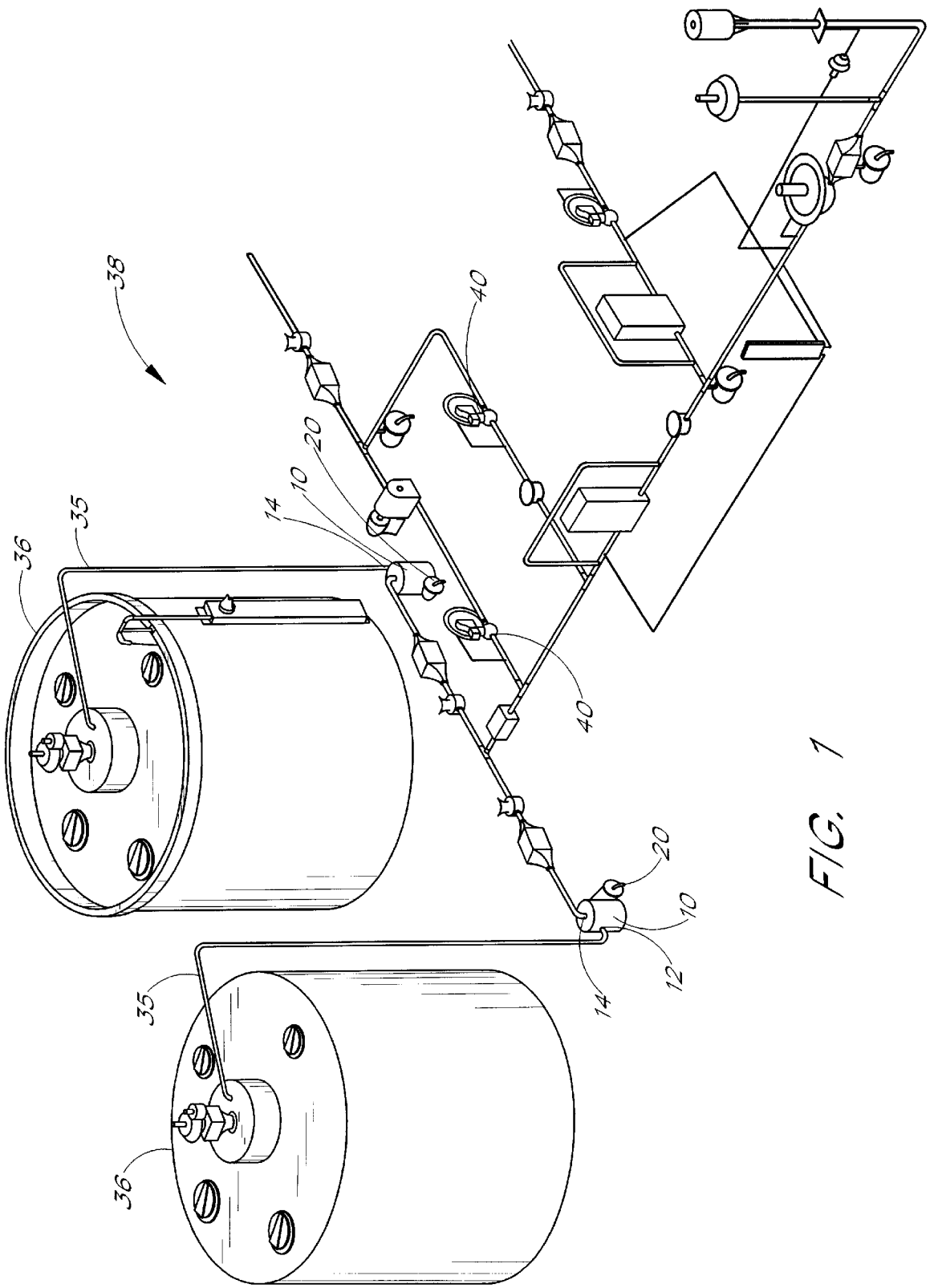
FIG. 1 is a perspective view a gas digester system.

Reference will now be made to the drawings wherein like numerals refer to like parts throughout. As shown in FIG. 1, there is provided in one aspect of the invention, a gas digester system 38 which is used for treating sewage. The system is comprised of two large digesters 36. Gas pipes 35 are connected to the digesters 36 and run from the digesters 36 into sediment traps 10, which will be discussed in greater detail below. Connected to the sediment trap 10 is a water drain system 20, which will be discussed in greater detail below. The gas pipes 35 continue from the sediment traps 10 through various gas digester components including pressure valves 40, blowers, compressors, boilers and other components for gas utilization and disposal illustrated in FIG. 1.

Digester gas, sediment and condensed water are forced out of the digesters 36, through the gas pipes 35 and into the sediment traps 10. In the sediment traps 10, condensed water and sediment are separated from the gas and accumulate in the bottom of the sediment trap 10. The gas then flows out of the sediment trap through outlet port 14 and continues through the digester gas system 38 for further treatment.

Figure 2A:
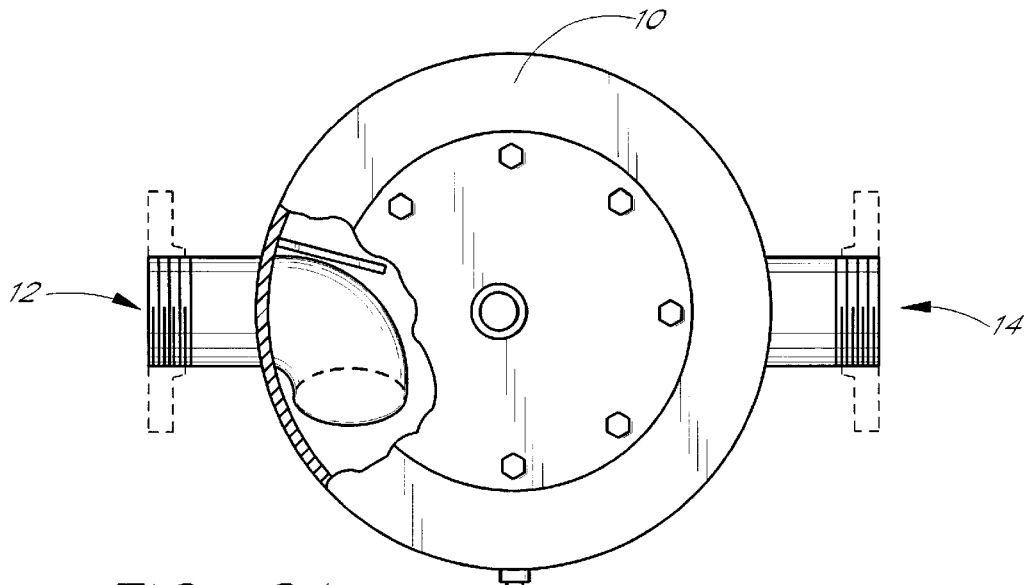
FIG. 2A is top view of a sediment trap system within the digester system of FIG. 1.
Figure 2B:
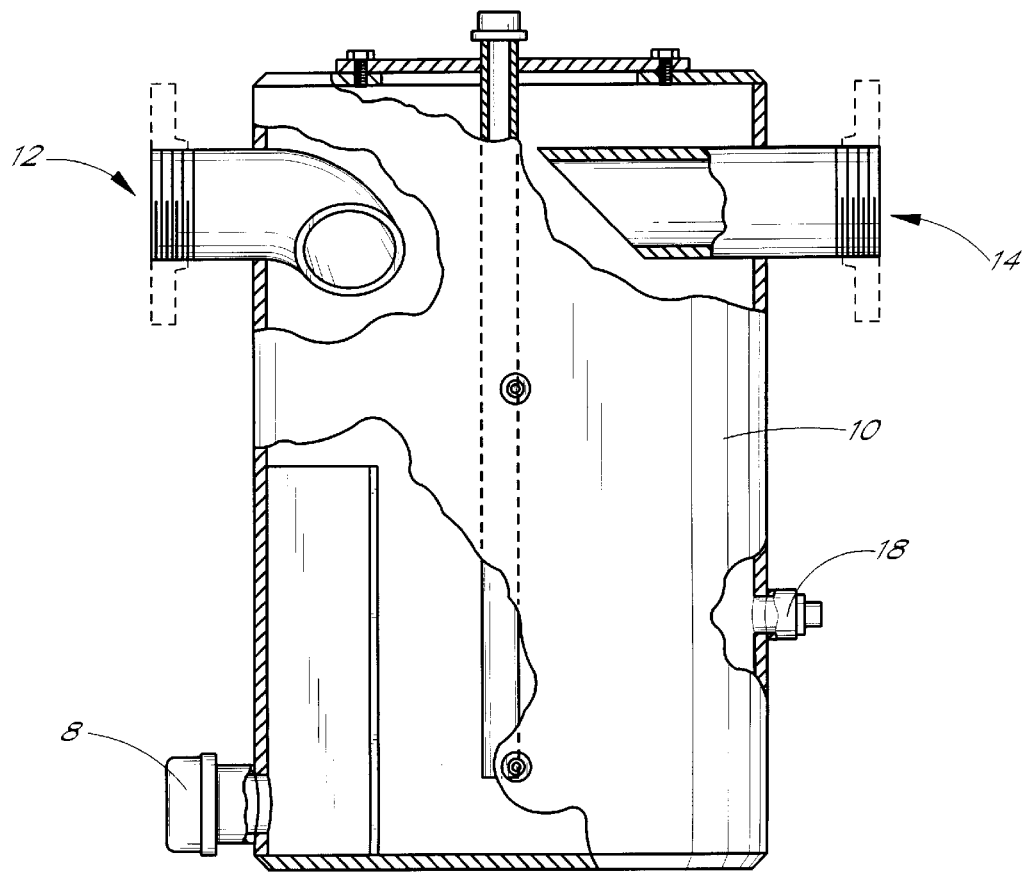
FIG. 2B is a side view of the sediment trap system of FIG. 2A.

As shown in FIGS. 2A,2B there is provided in accordance with one aspect of the invention, a sediment trap 10. Sediment traps 10 are well known in the art and can be an enclosed chamber comprising a gas inlet port 12 and a gas outlet port 14 connected at the top of the sediment trap 10 and positioned on opposite sides of the sediment trap 10. At the bottom of sediment trap 10 there is an apperature 8 protruding from the tank and configured with an outlet port. On another side of the sediment trap 10 there is a second aperture 18 positioned off the bottom of the sediment trap and configured with an outlet port. The volume of typical sediment trap 10 is twelve gallons.

Gas, sediment and condensed water are forced into sediment trap 10 through inlet port 12. Condensed water and sediment are separated from the gas and collect at the bottom of sediment trap 10. The separated gas continues through outlet port 14 for further treatment downstream. Aperture 8 is used as an outlet port for draining sediment that has accumulated in the bottom of sediment trap 10. Aperture 18 is an outlet port that is connected with a water drain system. Condensed water that accumulates in the sediment trap 10 is drained through aperture outlet port 18 into the water drain system.

Figure 3:
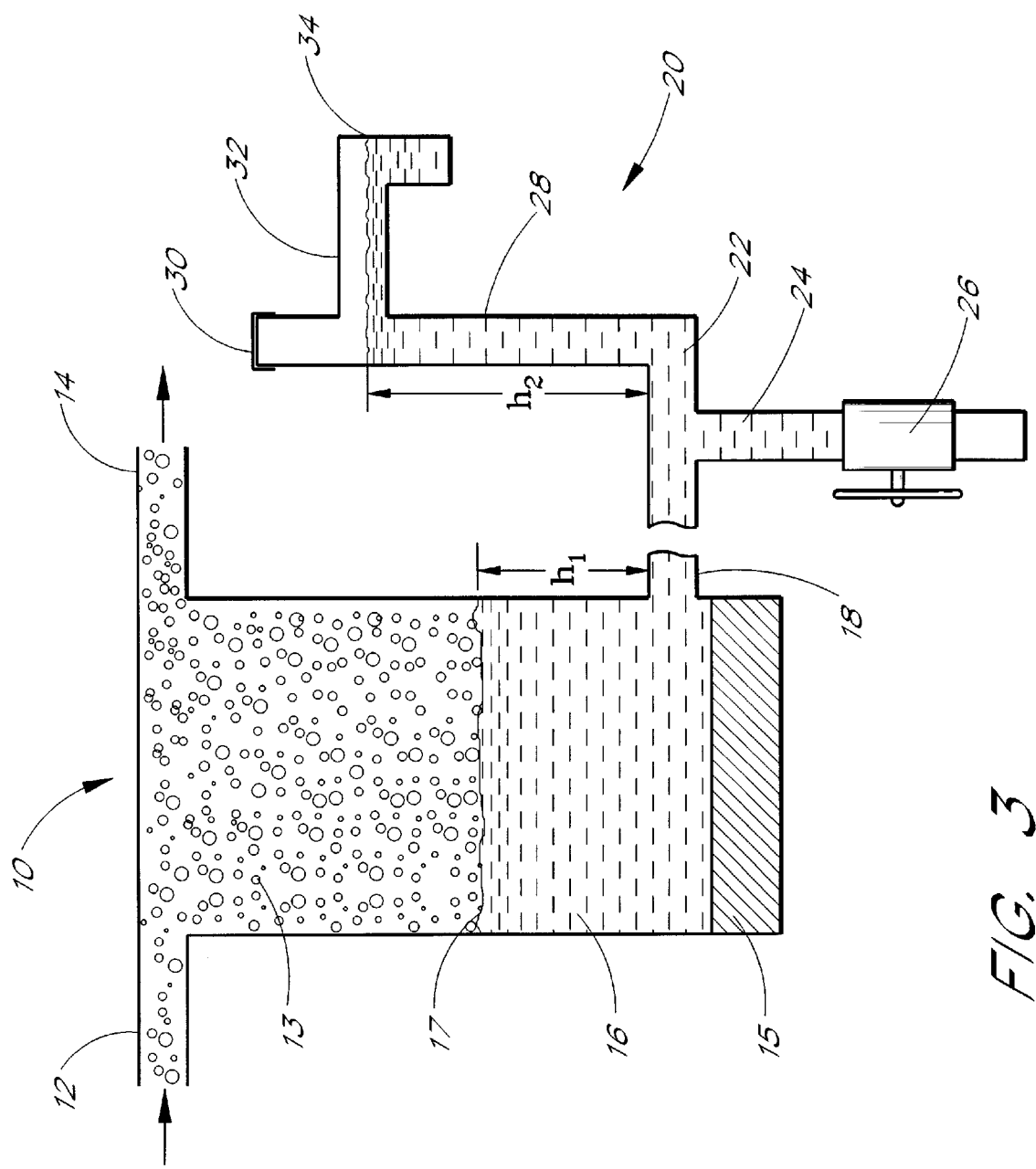
FIG. 3 is a schematic view of one preferred embodiment of an automatic water drain system.

As shown in FIG. 3, there is provided in accordance with one aspect of the invention, a sediment trap 10 in communication with a water drain system 20. The sediment trap 10 maintains a water column 16 of a height that does not reach outlet port 14. The sediment trap 10 further maintains a level of sediment 15 at the bottom of the sediment trap 10. The water drain system 20 comprises a horizontal pipe 22 that is attached to a vertical pipe 28 that extends in a direction substantially parallel with the water column 16 of the sediment trap 10. The water drain system 20 further comprises a valve 26 attached directly to either horizontal pipe 22 or an additional vertical pipe 24. The water drain system further comprises an anti-syphon vent and fill cap 30 attached to vertical pipe 28. Attached to vertical pipe 28 is a drain that is comprised of either a spout 34 or a horizontal pipe 32 attached to a spout 34.

In the preferred embodiment, the water drain system 20 will be constructed of standard 1 inch CPVC pipe, but can be constructed of any material and be of any diameter, so long as the length of pipe 28 corresponds with the gas pressure 13 and water column pressure 16.

Digester gas, condensed water and sediment are forced through the gas lines 35 (FIG. 1) into sediment trap 10 through gas inlet port 12. Referring to FIG. 3, as gas enters the sediment trap 10, condensed water and sediment are separated from the digester gas. The separated gas is expelled from the sediment trap 10 through outlet port 14 where the gas will be further treated and disposed of. The separated water 16 and sediment 15 settle at the bottom of sediment trap 10. The water forms a water column 16 of a height $h_1$ above the outlet port 18. As additional gas, water and sediment enter the sediment trap 10 and separate, additional water is added to the water column 16. The continuous gas pressure 13 and additional accumulated water 16 force an equal volume of water out of the sediment trap 10 through outlet port 18 into the water drain system 20. The gas and water pressure force water through outlet port 18 into horizontal pipe 22. Water continues to be forced up through vertical pipe 28 and expelled through drain or pipe 32. The height $h_2$ of the outlet pipe 32 above the outlet port 18 is equal to the height $h_1$ of the water column 16 in the sediment trap 10 plus the pressure of the gas 13 in inches of water. Thus, if the pressure of the gas 13 rises, the upper surface 17 of the water will go down. Likewise, if the gas pressure is reduced, the upper surface 17 will rise. Thus, water is continuously and automatically drained from the sediment trap 10 through the water drain system 20 without the use of manual effort or moving parts.

Without the application of pressurized gas 13 in the sediment trap 10, the height $h_1$ of the water column 16 would be equal to the height $h_2$ of the outlet port 32 above the outlet port 18. However, the pressurized gas 13 applied to the water column 16 in the sediment trap 10 creates a disparity in height $h_1$ between the water column 16 in sediment trap 10 and the height $h_2$ of outlet port 32 above the outlet port 18. The difference of these heights equals the gas pressure 13 in inches of water. The gas pressure 13, however, will not always be constant. At times, the gas pressure may increase thereby lowering the height $h_1$ of the water column 16 and, at the same time, force excess water out of the water drain system 20. Before the gas pressure 13 increases to a level in which all of the water will be drained from the water drain system 20 and gas 13 will escape into the atmosphere, gas pressure control valves 40 (FIG. 1) will be tripped thereby decreasing the gas pressure 13 in the sediment trap 10 and preventing such a gas release. When gas pressure 13 decreases to such a level that the water column 16 threatens to rise to the top of the sediment trap 10 and spillover through outlet port 14 into the gas lines, water will be drawn back out of the water drain system 20 and into the sediment trap 10. When all such water has been drawn out of the water drain system 20, atmospheric air, too, may be drawn through the water drain system 20 into the sediment trap 10. This newly added air will then contribute to the gas pressure 13 applied to the water column 16 and maintain a water column 16 that does not spillover into the gas lines. Thus, an equilibrium is maintained whereby the water column 16 in the sediment trap 10 and the water in vertical pipe 28 rise and fall depending on the variant gas pressure 13 applied to the water column 16; and this fluctuating water column 16 forces water out of the water drain system 20 while maintaining a seal to prevent gas from escaping into the atmosphere.

A proper height $h_2$ for outlet port 32 above outlet port 18 is necessary in order to maintain the equilibrium between the gas pressure 13 applied to the water column 16. Height $h_2$ for outlet port 32 above outlet port 18 can be lengthened in systems 38 with substantial gas pressure 13 so that even when the gas pressure 13 is at its maximum level, gas 13 cannot force all of the water out of the water drain system 20 and cause gas 13 to escape into the atmosphere. Height $h_2$ rises high enough to overcome the pressure on the gas 13 side of the system 38. In systems 38 with low gas pressure 13, $h_2$ will be shorter thus enabling the gas pressure 13 on the water column 16 to force water up vertical pipe 28 and out of the water drain system 20. Thus, the height $h_2$ of vertical pipe 28 is important in accommodating the fluctuating nature of the water column 16 and gas pressure 13 to automatically remove water, while at the same time, preventing water from entering the gas lines and gas from escaping through the water drain system 20 into the atmosphere. Therefore, in the preferred embodiment, height $h_2$ is highly significant in maintaining a properly functioning automatic water drain system (FIG. 3).

Water is inserted into the sediment trap 10 and automatic water drain system at the outset of operation, after which time the condensation in the digester gas 13 would continuously add to the water column 16, force water out of the water drain 20, thereby permitting the water to drain automatically.

As indicated above, gas pressure 13 in the sediment trap 10 is applied to the water column 16 in the sediment trap thereby forcing water into the water drain system 20 mounted on and adjacent to the sediment trap 20. Thus, water continuously fills the horizontal pipe 22 and a portion of the vertical pipe 28, and acts as a vapor seal to prevent leakage of gas 13 into the atmosphere. Overflow of water through pipe 32 prevents water 16 from escaping into the gas lines where it could damage equipment such as compressors, blowers and boilers, and interfere with gas utilization.

In the preferred embodiment, an anti-syphon vent and fill cap 30 is coupled to the water drain system 20 at the top of vertical pipe 28. This anti-syphon vent and fill cap 30 serves dual functions. When the water drain system 20 is first put into use, the cap 30 can be removed so that water can be inserted into the water drain system 20. As described above, it is necessary that a water column 16 be present in the sediment trap 10 and water drain system 20 in order for the automatic water drain system 1 to operate effectively. Thus, the cap 30 provides the water drain system 20 with an inlet for receiving water. The cap 30 also serves to prevent a negative pressure from forming in the automatic water drain system I which can syphon water back out of the drain 34 and into the water drain system 20, sediment trap 10, and gas lines 14.

The ball valve 26 configured with horizontal pipe 22 or vertical pipe 24 or the sediment trap 10 is well known in the art. In the preferred embodiment, it normally remains closed to prevent sediment and gas from escaping into the atmosphere and to permit the automatic water drain system to function as claimed. The ball valve 26 is opened periodically to drain sediment 15 from the sediment trap 10.

The competing pressures of the digester gas 13 and water column 16 within the sediment trap 10 effectively maintain a water seal preventing digester gas 13 from travelling through the water drain system 20 and escaping into the atmosphere while at the same time preventing water 16 from accumulating to such a degree that it rises and spills over into the gas outlet pipe 14 and flow downstream damaging equipment. This symbiotic relationship is maintained by the automatic water drain system which uses the competing pressures of the digester gas 13 and water column 16 to force additional accumulated water 16 out of the sediment trap 10, through the water drain system 20 and discharged through the drain 32,34. When additional water 16 is added to the water column 16, an equal amount is automatically discharged through the water drain system 20, and a steady water column is maintained without the use of manual effort or moving parts.

Although the preferred embodiment of the present invention has shown, described, and pointed out the fundamental novel features of the invention as applied to these embodiments, it will be understood that various omissions, substitutions, and changes in the form of the detail of the device illustrated, may be made by those skilled in the art without departing from the spirit of the present invention. Consequently, the scope of the invention should not be limited to the foregoing discussion, but is to be defined by the claims which follow.

What is claimed is:

1. An apparatus for removing water from a gas line carrying gas, water and sediment from a digester system in a sewage treatment facility, comprising:

a gas discharge pipe for carrying pressurized gas, sediment and condensed water from said digester a sediment trap connected to said gas discharge pipe, said sediment trap for collecting said condensed water and sediment from said gas and maintaining a water column, said sediment trap including a water outlet above the bottom of said water column and a sediment outlet;

a water drain system connected to receive water from said water outlet of said sediment trap and to automatically expel such water when the sum of the pressure of said gas and the pressure created by the height of said water column exceeds a predetermined level.

2. The apparatus of claim 1, wherein said water outlet is an aperture on a side surface of said sediment trap.

3. The apparatus of claim 2, wherein said sediment outlet is adjacent to the bottom surface of said sediment trap.

4. The apparatus of claim 1, wherein said water drain system additionally comprises an anti-syphon vent and fill cap to prevent back-flow into said sediment trap.

5. The apparatus of claim 1, wherein said water drain system additionally comprises a manual drain valve.

6. The apparatus of claim 1 wherein said water drain system comprises:

a horizontally extending pipe connected to said water outlet of said sediment trap;

a pipe connected to and extending vertically from said horizontally extending pipe; and a drain outlet attached to said vertical pipe at a height above said horizontally extending pipe which is equal to the sum of the height of the water in said sediment trap above said horizontally extending pipe and the pressure in said gas outlet pipe measured in inches of water.

7. The apparatus of claim 6, wherein the vertically extending pipe includes an anti-syphon vent and fill cap.

8. The apparatus of claim 1 wherein said water drain system comprises:

a pipe extending from said water outlet of said sediment trap to a position outside of said sediment trap above said water outlet; and an drain outlet from said pipe at said position, said position having a height above said water outlet of said sediment trap which is greater than the height of water in said sediment trap above said water outlet of said sediment trap by an amount determined by the pressure of the gas in said digester.

9. The apparatus of claim 1 additionally comprising:

A gas pressure control working in combination with said water drain system to prevent gas from being discharged from said water drain system.

* * * * *